E. D. Blakeman,

Fly Trap,

Nº 23,422.

Patented Mar. 29, 1859.

Witnesses
Benjamin Gates
Andrew Van Alstyne

Inventor
Elisha D. Blakeman

UNITED STATES PATENT OFFICE.

ELISHA D. BLAKEMAN, OF NEW LEBANON, NEW YORK, ASSIGNOR TO JACOB J. AUCHAMPAUGH AND LEVI AUCHAMPAUGH, OF SAME PLACE.

FLY-TRAP.

Specification of Letters Patent No. 23,422, dated March 29, 1859.

*To all whom it may concern:*

Be it known that I, ELISHA D. BLAKEMAN, of New Lebanon, in the county of Columbia and State of New York, have invented certain new and useful Improvements in Fly-Traps, the construction and operation of which I have described in the following specification and illustrated in its accompanying drawings with sufficient clearness to enable competent and skilful workmen in the arts to which it pertains or is most nearly allied to make and use my invention.

My said invention consists in the combination and arrangement of the poison cups with the main body of the fly trap, one being made in the form of a V surrounding the apex of the conical chamber and secured thereto by hooks, the other being made in the form of a funnel or inverted cone and suspended in the center of the opening of the conical chamber, the two cups being connected together by a continuation of the bail, for the purpose hereinafter more fully set forth.

Figure 1:
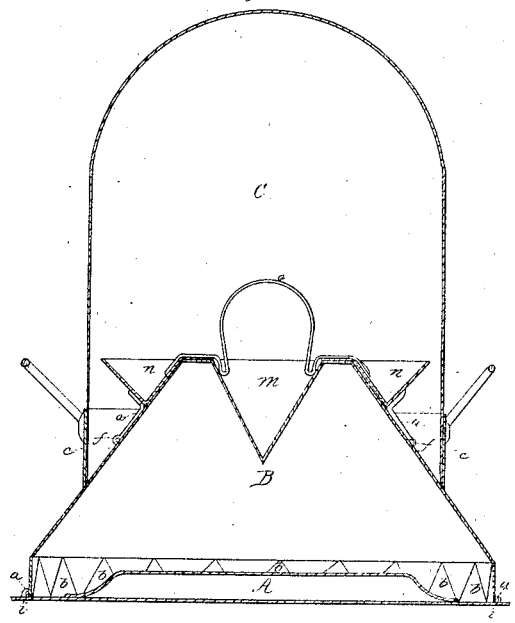
Figure 2:
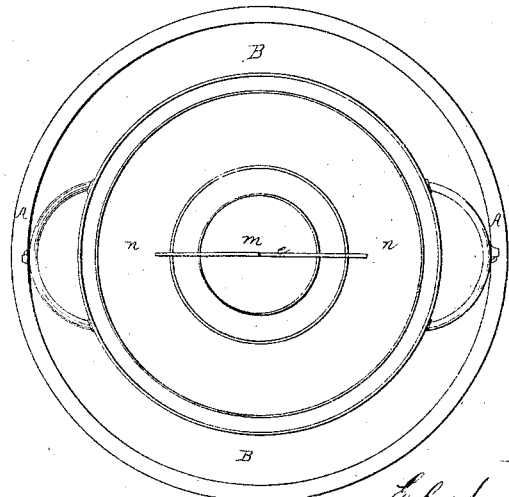

My invention is represented in the accompanying drawings as follows:

Figure 1 is a vertical section. Fig. 2 is a plan.

A is the base or bottom of the fly trap, upon which the bait to attract the flies is placed.

B is the chamber or main body of the trap.

$b$, $b$, $b$, are apertures formed in the bottom edge of the chamber B through which the flies pass in entering the trap.

$c$ is a circular flange passing around and secured to the body B midway between the top and bottom, having handles, one on each side.

C is a removable glass chamber, the bottom part of which is fitted on the inside of the flange $c$ resting on the conical shaped body B.

$n$ is a poison cup made in the form of a V the inner side of which surrounds and rests upon the apex of the conical chamber B and is attached thereto by hooks $a$, $a$, which catch in loops $f$ secured to the chamber B.

$e$ is a wire bail fastened to the cup $n$. $m$ is also a poison cup made in the form of a funnel or inverted cone and attached to the wire bail by which it is suspended in the center of the opening in the conical chamber B.

$i$ are hooks secured to the bottom part of the chamber B, which hook into loops $a$, attached to the bed plate of the trap and secure it thereto.

The operation of my improved fly trap is as follows: Molasses or any suitable bait is placed upon the bed plate A of the trap inside of the conically shaped chamber B, and the flies being attracted by the bait, enter through the apertures $b$, $b$, $b$, into the chamber and eat of the bait till they become satisfied then being attracted by the light above fly up through the annular space in the chamber B between the poison cups and are destroyed by eating the poison in the cups $n$ and $m$. When it is desired to take them from the trap the glass globe C is removed and the flies taken out.

The particular improvement which constitutes my said invention and which I claim as having been originally and first invented by me is—

The combination and arrangement of the poison cups $m$ and $n$ with the conical chamber B and bed plate A substantially as and for the purpose set forth.

ELISHA D. BLAKEMAN.

Witnesses:
BENJAMIN GATES,
ANDREW VAN ALSTYNE.